United States Patent
Hohenacker

(10) Patent No.: US 10,726,724 B2
(45) Date of Patent: Jul. 28, 2020

(54) CAR PARK MONITORING SYSTEM

(71) Applicant: CLEVERCITI SYSTEMS GMBH, Munich (DE)

(72) Inventor: Thomas Hohenacker, Starnberg (DE)

(73) Assignee: CLEVERCITI SYSTEMS GMBH, Munich (DE)

( * ) Notice: Subject to any disclaimer, the term of this patent is extended or adjusted under 35 U.S.C. 154(b) by 89 days.

(21) Appl. No.: 15/774,801

(22) PCT Filed: May 4, 2016

(86) PCT No.: PCT/EP2016/060040
§ 371 (c)(1),
(2) Date: May 9, 2018

(87) PCT Pub. No.: WO2017/080684
PCT Pub. Date: May 18, 2017

(65) Prior Publication Data
US 2018/0342159 A1    Nov. 29, 2018

(30) Foreign Application Priority Data

Nov. 9, 2015 (WO) ................. PCT/EP2015/076085

(51) Int. Cl.
*G08G 1/14* (2006.01)
*G07B 15/02* (2011.01)
*G06K 9/32* (2006.01)

(52) U.S. Cl.
CPC ............ *G08G 1/147* (2013.01); *G06K 9/325* (2013.01); *G07B 15/02* (2013.01); *G08G 1/142* (2013.01); *G08G 1/144* (2013.01); *G08G 1/146* (2013.01)

(58) Field of Classification Search
CPC ........... G06K 9/00771; G06K 9/00812; G06K 9/00624; G06K 9/325; G06K 9/4604;
(Continued)

(56) References Cited

U.S. PATENT DOCUMENTS

| 6,646,568 B2* | 11/2003 | MacPhail | G07B 15/04 340/905 |
| 10,311,731 B1* | 6/2019 | Li | G08G 1/142 |
| 10,386,845 B1* | 8/2019 | Konrardy | B60R 25/255 |
| 2011/0099126 A1* | 4/2011 | Belani | G06Q 30/0284 705/418 |

(Continued)

FOREIGN PATENT DOCUMENTS

| DE | 4401993 A1 | 10/1995 |
| WO | 2013139454 A1 | 9/2013 |

OTHER PUBLICATIONS

International Preliminary Report on Patentability dated May 24, 2018—International Application No. PCT/EP2016/060040—2 pages.

*Primary Examiner* — Aklilu K Woldemariam
(74) *Attorney, Agent, or Firm* — Amster, Rothstein & Ebenstein LLP

(57) ABSTRACT

The invention relates to a car park monitoring system for detecting free and occupied parking spaces in a car park area, comprising a detection unit and a camera system, the camera system being designed to supply image evidence from within the car park area, and the detection unit being designed to assign, depending on said image evidence, an occupation status to the parking spaces which indicates whether a parking pace is free or occupied. The car park monitoring system is characterized in that the detection unit is further designed to store the image evidence for at least one corresponding parking space as a first snapshot when the occupation status of the parking space in question changes from free to occupied, and additionally to store the image evidence as a second snapshot when a limiting condition is met.

18 Claims, 2 Drawing Sheets

Figure 1:
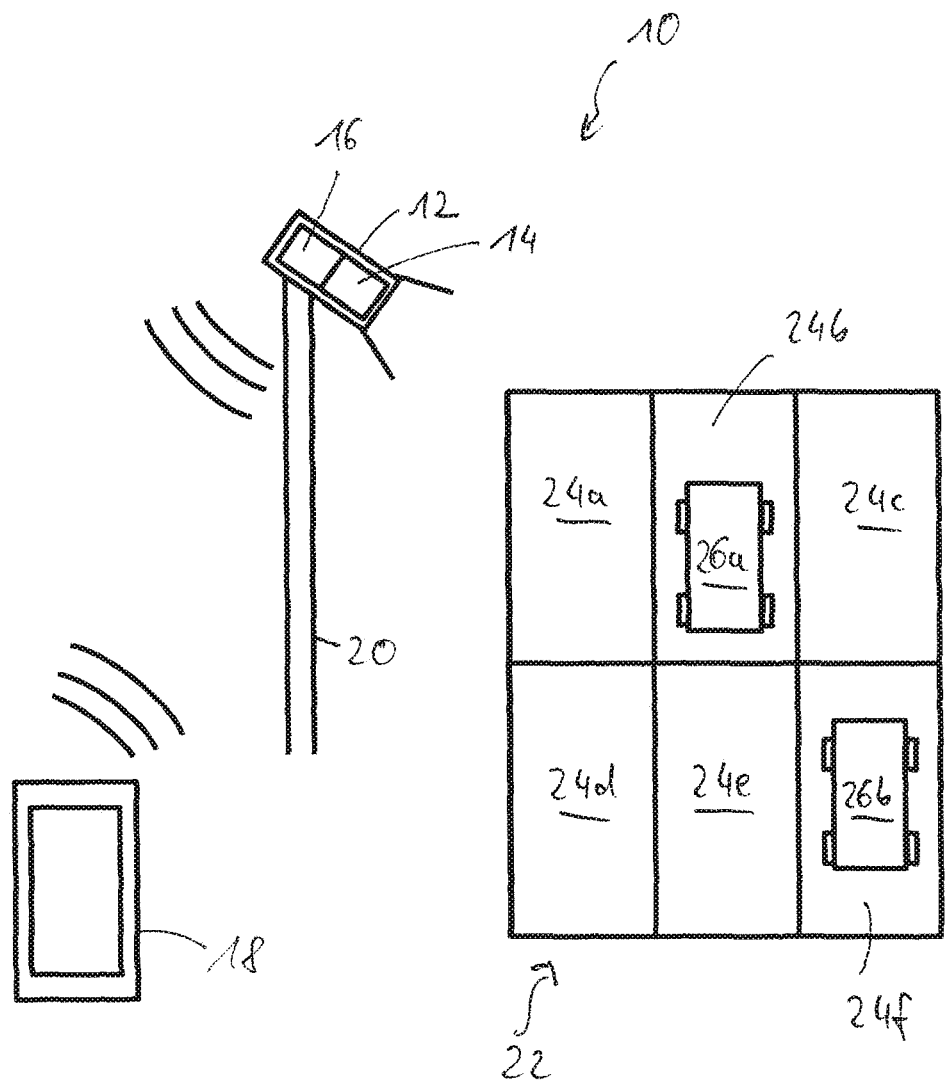

(58) Field of Classification Search
CPC .... G06K 2209/15; G06K 9/62; G06K 9/6267;
G06K 9/00845; G06K 9/00221; G06K
9/00798; G06K 9/00825; G06K 9/00832;
G06K 9/3241; G06K 9/00785; G06K
9/00791; G06K 9/00838; G08G 1/0175;
G08G 1/142; G08G 1/146; G08G 1/147;
G08G 1/168; G08G 1/14; G08G 1/0112;
G08G 1/143; G08G 1/0116; G08G
1/0133; G08G 1/0145; G08G 1/08; G08G
1/144; G08G 1/148; G08G 1/166; G08G
1/005; G08G 1/096791; G08G 1/165;
G08G 1/202; G08G 1/20; G08G 1/017;
G08G 1/133; G06T 2207/30264; G06T
7/70; G06T 7/292; G06T 2207/30236;
B60R 7/04; G07C 1/30; H04W 4/40;
H04W 4/021; H04W 4/046; H04W 4/46;
Y10S 194/902; G01S 13/08; G07F
17/246; B60W 30/0956; G06F 16/29;
G06N 20/00; H04N 7/181; G05D 1/0287;
G05D 2201/0213; G05D 2201/0207;
B60L 53/36; G07B 15/02; G07B 15/00;
G01C 21/3685; G08B 13/19602
USPC .................. 382/103; 348/148; 340/928, 932
See application file for complete search history.

(56) References Cited

U.S. PATENT DOCUMENTS

| | | | | |
|---|---|---|---|---|
| 2011/0102197 | A1* | 5/2011 | Herwich | G08G 1/14 340/932.2 |
| 2012/0323643 | A1* | 12/2012 | Volz | G07B 15/02 705/13 |
| 2013/0116887 | A1* | 5/2013 | Tieman | G08G 1/166 701/36 |
| 2014/0111647 | A1* | 4/2014 | Atsmon | H04N 7/185 348/148 |
| 2014/0210646 | A1* | 7/2014 | Subramanya | B61L 29/28 340/928 |
| 2014/0218527 | A1* | 8/2014 | Subramanya | G08G 1/143 348/148 |
| 2014/0335897 | A1 | 11/2014 | Clem et al. | |
| 2015/0009048 | A1* | 1/2015 | Wang | G08G 1/144 340/932.2 |
| 2016/0078759 | A1* | 3/2016 | Nerayoff | H04N 5/23203 701/3 |
| 2016/0125736 | A1* | 5/2016 | Shaik | G08G 1/14 701/23 |
| 2016/0178376 | A1* | 6/2016 | Moore | G01C 21/3685 701/532 |
| 2016/0232411 | A1* | 8/2016 | Krishnamoorthy | G07F 17/246 |
| 2016/0307047 | A1* | 10/2016 | Krishnamoorthy | G06T 7/73 |
| 2016/0307048 | A1* | 10/2016 | Krishnamoorthy | H04N 5/247 |

\* cited by examiner

CAR PARK MONITORING SYSTEM

The present invention relates to a parking space monitoring system for detecting free and occupied parking space areas in a parking space zone comprising a recognition unit and a camera system, wherein the camera system is configured for delivering image indications from within the parking space zone and wherein the recognition unit is configured to associate a respective occupation status with the parking space areas in dependence on the image indications that designates whether a respective parking space area is free or occupied.

Parking space monitoring systems that in particular monitor parking space zones by means of cameras and output an occupation status of the parking space areas are generally known.

Disadvantageously, it is only possible to detect unpaid parking or illegal parking with great difficult with reference solely to an occupation status.

It is therefore the underlying object of the invention to provide a parking space monitoring system that is suitable to carry out a legally acceptable detection of unauthorized or unpaid parking processes.

This object is satisfied in accordance with the invention by a parking space monitoring system in accordance with claim 1 and in particular in that the recognition unit is configured to store the image indications for at least one respective parking space area as a first snapshot when the occupation status of the respective parking space area changes from free to occupied and to additionally store the image indications for at least the respective parking space area as a second snapshot when a condition is satisfied.

In other words, the first snapshot (e.g. of the vehicle) can be taken and stored approximately at the start of a parking process to document the start of the parking process. If the conditions is later satisfied, that can, for example, indicate that the maximum parking time has been exceeded, the second snapshot is taken and stored. The condition can in this respect relate to a single parking space area or also to a plurality of parking space areas simultaneously. It can then be documented with reference to the two snapshots that the vehicle had parked in a parking space area longer than the allowed maximum parking time. Legally acceptable proof can hereby be provided.

It is a particular advantage of the storing of snapshots that the snapshots show respectively important points in time of a parking process (for example, the start and the moment of the exceeding of the maximum parking time) and thus only a few snapshots have to be stored that accordingly require less memory. No second snapshots of vehicles are in particular taken if said vehicles do not satisfy the condition and, for example, do not exceed the maximum parking time.

The condition can alternatively or additionally also be satisfied when, for example, a business to which a respective parking space area belongs closes, when a predefined time is reached, when a maximum parking time has been exceeded by more than a predefined time interval (e.g. five minutes) or when a parking process has been started in a prohibited zone (e.g. a no parking zone). The condition can be communicated to the recognition unit, for example, in the form of an input signal or in the form of digital data. What the associated maximum parking time for the respective parking space area is can in particular be communicated to the recognition unit for each parking space area in the parking space zone. The recognition unit can then itself determine when the condition is satisfied.

The image indications can be camera images, i.e. single images. The image indications of the parking space areas delivered to the recognition unit can, for example, be image recordings of the complete parking space areas or also only images of part areas of the parking space areas. The image indications only have to represent a parking space area in such a manner that the recognition unit can associate an occupation status with the parking space areas using the image indications, said occupation status designating whether a respective parking space area is free or occupied. The snapshots are based on the image indications and can in particular be part regions or sections of the image indications. The snapshots are preferably selected such that one snapshot only shows one respective vehicle completely.

A parking space zone designates a surface area in which a plurality of parking space areas are located along a road. A parking space area can also be called a single bay, that is one parking space area typically provides space for one vehicle. The parking space areas can have different sizes and can thus, for example, be adapted to the size of passenger cars, trucks or bicycles.

The parking space areas within the parking space zone can be fixed at one time, for example. Alternatively, the parking space areas can also be recognized with reference to the position of vehicles. It is in particular not necessary that the parking space areas are marked by lines and the like. In addition, areas can also be fixed or determined in which parking is generally unwanted or prohibited (prohibited zones). Such areas can e.g. be a road or a fire engine access zone.

The vehicles can be passenger cars, trucks, motorcycles, bicycles, trailers and the like. It is likewise possible that the vehicles are ships or aircraft. In this case, the parking space areas can be mooring stations of a port or parking positions at an airport.

Advantageous further developments of the invention can be seen from the description, from the drawings and from the dependent claims.

In accordance with a first advantageous embodiment, the snapshots substantially only relate to the respective parking space area. This means that the snapshot can at least substantially show only one single parking space area. In this manner, strict data protection rules can be observed since on an exceeding of a maximum parking time on one parking space area, the events on the neighboring parking space areas are not stored.

In accordance with a further advantageous embodiment, the recognition unit is configured only to output the snapshots on the occurrence of the condition, in particular to a display unit. The snapshots can preferably only be stored in the recognition unit prior to the output, whereby again high data protection demands can be satisfied. The display unit can in particular be a mobile display unit for parking attendants. A data volume to be transmitted can be greatly reduced due to the output only of snapshots and only when the condition is satisfied.

In accordance with a further advantageous embodiment, the recognition unit is configured to delete the snapshots when the occupation status of a respective parking space area has changed from occupied to free prior to the occurrence of the condition. It can hereby likewise be ensured that vehicles or persons who do not exceed the maximum parking time do not remain permanently on record by means of the snapshots. In addition, the demands on the storage capacity of the recognition unit are reduced by the deletion of the snapshots.

The recognition unit can be a local gateway (i.e. a local processor) that communicates with the camera system. The camera system can in particular also have a plurality of cameras that are arranged in a distributed manner and that are connected to the recognition unit. Alternatively, the recognition unit can also be integrated in one of the cameras and can preferably be designed as an embedded system.

The snapshots are particularly preferably only stored in the recognition unit prior to the occurrence of the condition. Data traffic can hereby in turn be saved since the snapshots are only output by the recognition unit on the occurrence of the condition.

Alternatively, the recognition unit can be configured to output at least the first snapshot prior to the occurrence of the condition and to provide it for the carrying out of a payment procedure. The first snapshot can be displayed to the driver of that vehicle that is shown in the first snapshot. The driver can then confirm on the payment of his parking process that he would like to pay for the vehicle shown in the first snapshot, for example by touching the vehicle on a screen. A link between the payment procedure, the respective vehicle, the snapshot, and a position of the vehicle can be provided by the confirmation. In addition to the first snapshot, a map showing the position of the driver's vehicle can also be displayed to the driver. It can hereby be made easier for the driver to reach his vehicle.

Instead of the first snapshot or in addition to the first snapshot, further snapshots can also be provided by the recognition unit for the carrying out of a payment procedure. The snapshots can in particular be transmitted to a ticket machine (i.e. to a payment machine) or to an app of a smartphone, with the app permitting the payment of parking charges.

The condition further preferably comprises a maximum parking time. The recognition unit can, for example, be coupled to a ticket machine for payment of charges for this purpose. The ticket machine can respectively communicate to the recognition unit when the maximum parking time for a respective parking space area has been reached.

The ticket machine can be configured for the association of the maximum parking time to a specific parking space area to query the parking space area used by a vehicle (e.g. "Section B, Bay 4") on the payment of charges. Alternatively or additionally, a license plate of the respective vehicle can also be queried on the payment of charges. In general, the payment of charges can take place coupled to a license plate (i.e. to a vehicle), for example also by means of an app on a smartphone. A maximum parking time for the respective parking space area can then be determined with reference to the payment of charges.

The parking space monitoring system can preferably comprise a license plate recognition unit. The license plate recognition unit serves to detect the license plates of vehicles that use the parking space areas and in particular to associate the respective license plate of the vehicle to a respective parking space area on which the vehicle is parked.

The license plate recognition unit can, for example, comprise a portable unit in which parking attendants manually input the license plates. The license plate recognition unit can likewise comprise a camera that is in particular attached to a vehicle (a so-called "scan car") and is thus mobile. If the license plate recognition unit is mobile, the license plate recognition unit can comprise a GPS unit to allocate a GPS position and thus a specific parking space area to the recognized license plates.

Alternatively, the camera can also be at a fixed position, e.g. at an entry to the parking space zone, or can be arranged slightly elevated above the parking space zone. The license plate recognition unit can be configured to associate recognized license plates with respective parking space areas.

The camera of the license plate recognition unit can in particular also be a camera of the camera system of the parking space monitoring system. A camera of the camera system can be utilized in a dual function in this manner.

In accordance with a further advantageous embodiment, the conditions for at least some of the parking space areas differ. It is hereby made possible to fix different parking zones, for example short parking zones. Different types of parking spaces can thus be simultaneously monitored by the parking space monitoring system.

In accordance with a further advantageous embodiment, the parking space monitoring system comprises a transmission unit and a mobile display unit, with the recognition unit furthermore being configured to store the geographical coordinates of parking space areas located in the field of view of the camera system and/or to provide the respective occupation status of at least the free parking space areas, in particular with the associated geographical coordinates, to the transmission unit, with the transmission unit being configured to transmit the respective occupation status of at least the free parking space areas with the associated geographical coordinates to the mobile display unit.

The mobile display unit can be the aforesaid display unit. The occupation status of occupied parking space areas and in particular also the snapshots are preferably also transmitted to the display unit by the transmission unit.

Free parking space areas within each parking space zone monitored by a camera system can therefore be dynamically determined. To implement the parking space monitoring system, at least one camera system, at least one recognition unit, at least one transmission unit, and at least one display unit preferably act together. The camera system is in this respect in particular mounted at a street-lighting device, whereby it is achieved in an advantageous manner that no permission from private building owners has to be obtained for the installation. In addition, where required, the energy source of the street-lighting device can enable the energy supply of the camera system and of components connected thereto; alternatively, however, storage battery operation or battery operation is also possible. The camera system can be installed and oriented such that it can preferably detect a respective plurality of parking space areas of a parking space zone.

The recognition unit is preferably configured to take further snapshots of the respective parking space area, in particular at specific time intervals, after the occurrence of the condition. This means that further snapshots can, for example, be taken at least every five minutes or every two minutes. When a parking procedure was actually ended after exceeding the maximum parking time can be exactly documented in this manner.

In accordance with a further advantageous embodiment, further snapshots are also already taken at specific time intervals after the first snapshot. It can additional be demonstrated by these snapshots that are taken and stored in time between the first snapshot and the second snapshot that a vehicle was permanently parked in a parking space area and did not briefly leave the parking space area.

In accordance with a further advantageous embodiment, the first snapshot and the second snapshot and/or at least one of the further snapshots are displayed on a display unit, in particular next to one another, after the occurrence of the condition. The first snapshot and that snapshot that was taken last in time are preferably shown on the display unit here. The start and the end of a parking process can hereby be visualized, for example. Whether a vehicle has moved during the parking process or not can additionally easily be recognized by the presentation next to one another. If no movement (i.e. no change of the position of the vehicle) can be determined, clear proof is in turn provided that the maximum parking time has been exceeded.

The display unit particularly preferably reproduces further information relating to the respective parking space area in addition to the snapshots, in particular a time of arrival, a time of stay, or a map in which the respective parking space area is marked. Parking attendants can determine, for example, on the basis of the additional information whether an exceeding of the maximum parking time or an exceeding of the paid parking time is actually present. The parking attendants can additionally be guided in a simple manner to the respective vehicle or to the respective parking space area with reference to the display of the parking space area on a map.

In addition to said additional information, the display unit can also indicate a comparison value that is calculated by means of an image comparison by the display unit or the recognition unit. The comparison value can in particular indicate how much the positions of the vehicle in the respective snapshots resemble one another. If the comparison value exceeds a predefined limit value, it can be assumed that the vehicle has not moved and had thus parked permanently on the parking space area. The comparison value can as a consequence allow an automatic issuing of fines and the like.

The snapshots further preferably each include a GPS position and/or a time. The GPS position can indicate the position of one or more pixels of the snapshot. A respective position and/or the time at which the snapshot was taken can therefore be overlaid on the snapshots. How long a vehicle has parked in a respective parking space area can thus also be determined by the comparison of the time between different snapshots.

To be able to assign a GPS position to the snapshots, the parking space monitoring system is preferably configured to assign a GPS position to the image indications. A GPS position can in particular be known and stored for each pixel of an image of the image indications. The snapshots can then advantageously be cut out or generated from the image indications using the GPS position.

In accordance with a further advantageous embodiment, the snapshots comprise respective image sections that are in particular shown in gray values. A further reduction of the data to be transmitted or to be stored can take place on the basis of the representation in gray values.

In accordance with a further advantageous embodiment, the snapshots each comprise edge images or contour images. On the use of edge images or contour images, only the outlines of a vehicle can be recognized, whereby the already mentioned strict data protection rules for public spaces can also be observed. The edge images or contour images can be generated, for example by an edge filter algorithm such as the Sobel algorithm, from the image indications. The edge images or contour images allow a vehicle to be recognized solely with reference to its outlines and also enable a possible movement of the vehicle between two snapshots to be determined.

In other words, the recognition unit can additionally be configured to output edge images or contour images of (motor) vehicles detected by the camera system. The edge images or contour images can be a black-and-white representation of a section of the camera image or of the image indications, wherein the edge images or contour images are in particular output when a maximum parking time has been exceeded by a vehicle. The edge images or contour images can show the vehicle at the start of the parking procedure and after the reaching of the maximum parking time, with the edge images or contour images e.g. being able to be communicated directly to parking attendants. The edge images or contour images can comprise time information and/or position information (GPS information).

An exceeding of the maximum parking time can e.g. be displayed to the parking attendants on the basis of the output edge images or contour images. It can additionally be determined by a comparison of the images at the start of the parking process with the images after the reaching of the maximum parking time whether the vehicle has moved during the parking process. If no movement can be found, this is legally acceptable proof of the exceeding of the maximum parking time. The maximum parking time for a respective parking space area can be stored in the recognition unit.

If, for example, the edge images or contour images are not sufficient to demonstrate the exceeding of the maximum parking time, the snapshots can additionally also be output in gray values.

A further subject of the invention is a method of detecting free and occupied parking space areas in a parking space zone in which a camera system is used for delivering image indications from within the parking space area and a recognition unit associates a respective occupation status to the parking space zones in dependence on the image indications that designates whether a respective parking space area is free or occupied. The method in accordance with the invention is characterized in that the image indications for at least one respective parking space area are stored as a first snapshot when the occupation status of the respective parking space area changes from free to occupied and the image indications are additionally stored as a second snapshot for at least the respective parking space area when a condition is satisfied.

The statements on the parking space monitoring system in accordance with the invention apply accordingly to the method in accordance with the invention, in particular with respect to advantages and preferred embodiments.

Figure 2:
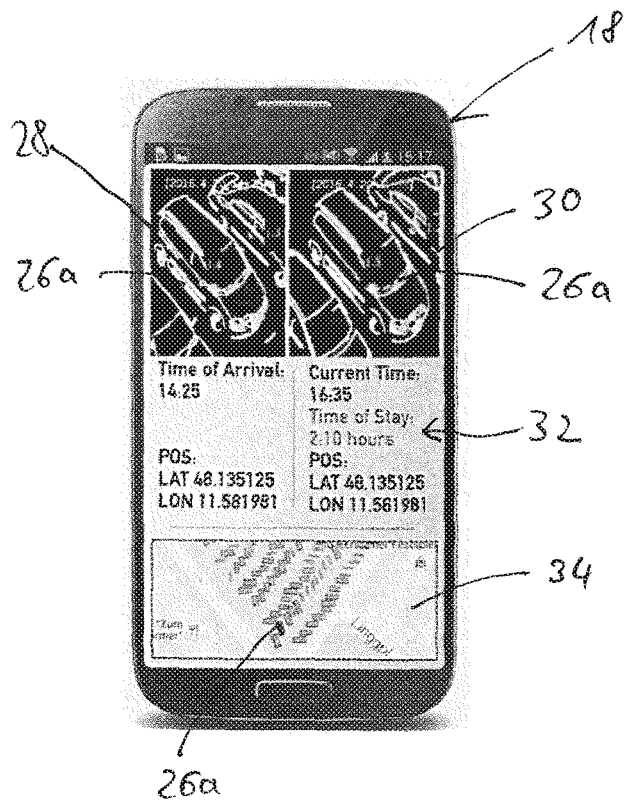
Figure 3:
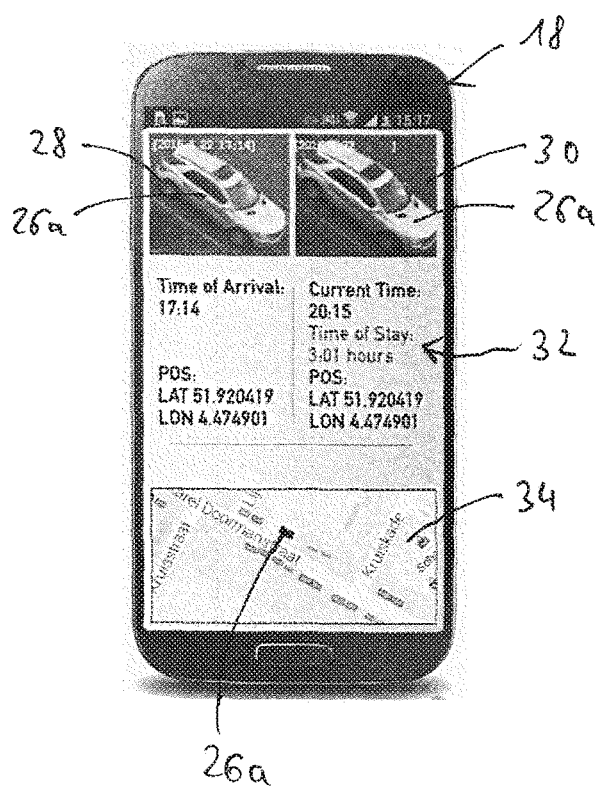

The invention will be described in the following purely by way of example with reference to the drawings. There are shown:

FIG. 1 a parking space monitoring system in a schematic view;

FIG. 2 a mobile display unit that presents snapshots in the form of contour images; and FIG. 3 a mobile display unit that presents snapshots in the form of gray value images.

FIG. 1 shows a parking space monitoring system 10 that comprises a camera 12. A recognition unit 14 and a transmission unit 16 are integrated in the camera 12. The transmission unit 16 communicates by radio with a mobile display unit 18 in the form of a smartphone.

The camera 12 is attached to a mast 20 elevated over a parking space zone 22. The parking space zone 22 comprises a plurality of parking space areas 24a, 24b, 24c, 24d, 24e, 24f.

Respective vehicles 26a, 26b are parked on two of the parking space areas 24.

The camera 12 monitors the parking space areas 24 of the parking space zone 22, with the recognition unit 14 outputting an occupation status for each of the parking space areas 24 that designates whether a respective parking space area 24 is free or occupied. The camera 12 takes image indications in the form of single images for this purpose.

In the example shown in FIG. 1, a first snapshot 28 is produced on the entering of the vehicle 26a into the parking space area 24b and is first only stored in the recognition unit 14. The first snapshot 28 is, for example, shown n FIG. 2 and only shows vehicle 26a completely.

A maximum parking time for each of the parking space areas 24 can, for example, amount to two hours.

If the maximum parking time for the parking space area 24b is exceeded by the vehicle 26a, a second snapshot 30 is taken by the recognition unit 14 and is stored. The snapshots 28, 30 are each an image section that is shown as a contour image. After the exceeding of the maximum parking time, the snapshots 28, 30 are transmitted to the mobile display unit 18 and are displayed as shown in FIG. 2.

The mobile display unit 18 (FIG. 2) shows the snapshots 28, 30 next eon one another and displays additional information 32 and a map 34 beneath the snapshots 28, 30. The additional information in particular indicates a time of arrival, a current time, a time of stay, and a GPS position (POS) of the vehicle 26 on the arrival at the parking space zone 24b and a GPS position (POS) on the recording of the second snapshot 30. It can easily be determined with reference to a comparison of the snapshots 28, 30 and of the GPS position whether the vehicle 26a has moved during its parking procedure.

In general, it can therefore be legally flawlessly demonstrated on the basis of the snapshots 28, 30 and of the additional information 32 that an exceeding of the maximum parking time was present. Parking attendants can additionally locate the vehicle 26a that is marked on the map 34 with reference to the map 34.

A further mobile display unit 18 is show in FIG. 3. Unlike the mobile display unit 18 of FIG. 2, no contour images are displayed in FIG. 3, but rather gray value images as snapshots 28, 30.

REFERENCE NUMERAL LIST 10 parking space monitoring system
12 camera
14 recognition unit
16 transmission unit
18 mobile display unit
20 mast
22 parking space zone
24 parking space areas
26 vehicles
28 first snapshot
30 second snapshot
32 additional information
34 map

The invention claimed is:

1. A parking space monitoring system for detecting free and occupied parking space areas in a parking space zone, the parking space monitoring system comprising:
a recognition unit and a camera system, wherein the camera system is configured to deliver image indications from within the parking space zone and the recognition unit is configured to associate a respective occupation status with the parking space areas in dependence on the image indications, with the occupation status designating whether a respective parking space area is free or occupied,
wherein the recognition unit is further configured to store the image indications for at least one respective parking space area as a first snapshot when the occupation status of the respective parking space area changes from free to occupied and additionally to store it as a second snapshot when a condition is satisfied,
the second snapshot is taken at a time later than a time the first snapshot is taken,
the first snapshot and the second snapshot are displayed next to one another at a display unit after the occurrence of the condition,
the display unit reproduces further information relating to the respective parking space area in addition to the first and second snapshots, and
the further information comprises a time of arrival, a time of stay, or a map on which the respective parking space area is marked.

2. The parking space monitoring system in accordance with claim 1,
wherein the first and second snapshots substantially only relate to the respective parking space area.

3. The parking space monitoring system in accordance with claim 1,
wherein the recognition unit is configured only to output the first and second snapshots on the occurrence of the condition.

4. The parking space monitoring system in accordance with claim 3,
wherein the recognition unit is configured only to output the first and second snapshots to the display unit.

5. The parking space monitoring system in accordance with claim 1,
wherein the recognition unit is configured to delete the first and second snapshots when the occupation status of a respective parking space area changes from occupied to free prior to the occurrence of the condition.

6. The parking space monitoring system in accordance with claim 1,
wherein the first and second snapshots are only stored in the recognition unit prior to the occurrence of the condition.

7. The parking space monitoring system in accordance with claim 1, wherein the recognition unit is configured to output at least the first snapshot prior to the occurrence of the condition and to provide the first snapshot for the carrying out of a payment procedure.

8. The parking space monitoring system in accordance with claim 1,
wherein the condition comprises a maximum parking time.

9. The parking space monitoring system in accordance with claim 1,
further comprising a license plate recognition unit that serves to detect the license plates of vehicles that use the parking space areas.

10. The parking space monitoring system in accordance with claim 9,
wherein the license plate recognition unit is configured to associate the respective license plate of the vehicle with a respective parking space area on which the vehicle is parked.

11. The parking space monitoring system in accordance with claim 1,
wherein the conditions for at least some of the parking space areas differ.

12. The parking space monitoring system in accordance with claim 1,
further comprising a transmission unit and a mobile display unit, with the recognition unit furthermore being configured
to store the geographical coordinates of parking space areas located in the field of view of the camera system;
to provide the respective occupation status of at least the free parking space areas with the associated geographical coordinates to a transmission unit,
with the transmission unit being configured to transmit the respective occupation status of at least the free parking space areas with the associated geographical coordinates to the mobile display unit.

13. The parking space monitoring system in accordance with claim 1,
wherein the recognition unit is configured to take further snapshots of the respective parking space area after the occurrence of the condition.

14. The parking space monitoring system in accordance with claim 13,
wherein the recognition unit is configured to take said further snapshots at specific time intervals.

15. The parking space monitoring system in accordance with claim 13,
wherein the first snapshot and the second snapshot and at least one of the further snapshots are displayed at the display unit after the occurrence of the condition.

16. The parking space monitoring system in accordance with claim 15,
wherein the first snapshot and the second snapshot and at least one of the further snapshots are displayed next to one another at the display unit.

17. The parking space monitoring system in accordance with claim 1,
wherein the first and second snapshots each comprise edge images or contour images.

18. A method of detecting free and occupied parking space areas in a parking space zone, in which
a camera system is used for delivering image indications from within the parking space zone and a recognition unit associates a respective occupation status with the parking space areas in dependence on the image indications that designates whether a respective parking space area is free or occupied,
wherein the image indications for at least one respective parking space area are stored as a first snapshot when the occupation status of the respective parking space area changes from free to occupied and are additionally stored as a second snapshot when a condition is satisfied,
the second snapshot is taken at a time later than a time the first snapshot is taken,
the first snapshot and the second snapshot are displayed next to one another at a display unit after the occurrence of the condition,
the display unit reproduces further information relating to the respective parking space area in addition to the first and second snapshots, and
the further information comprises a time of arrival, a time of stay, or a map on which the respective parking space area is marked.

* * * * *